No. 853,917.  
PATENTED MAY 14, 1907.  
W. P. CLIFFORD & W. W. RANKIN.  
ORE SEPARATING AND CONCENTRATING MACHINE.  
APPLICATION FILED MAR. 2, 1906.  
2 SHEETS—SHEET 2.
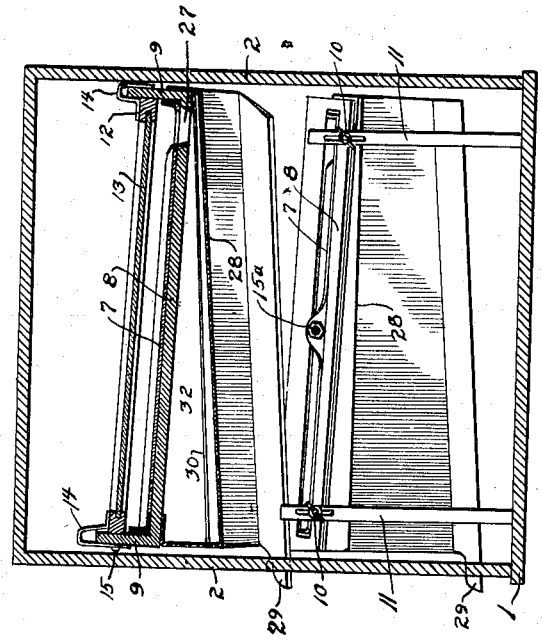
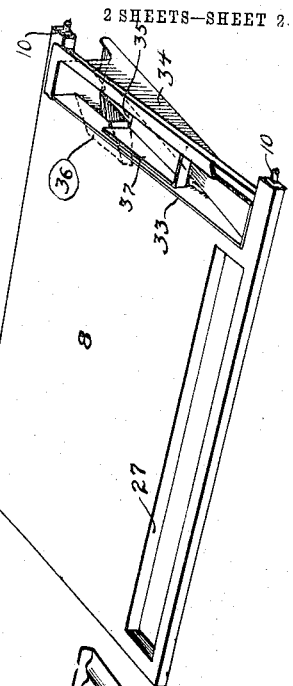
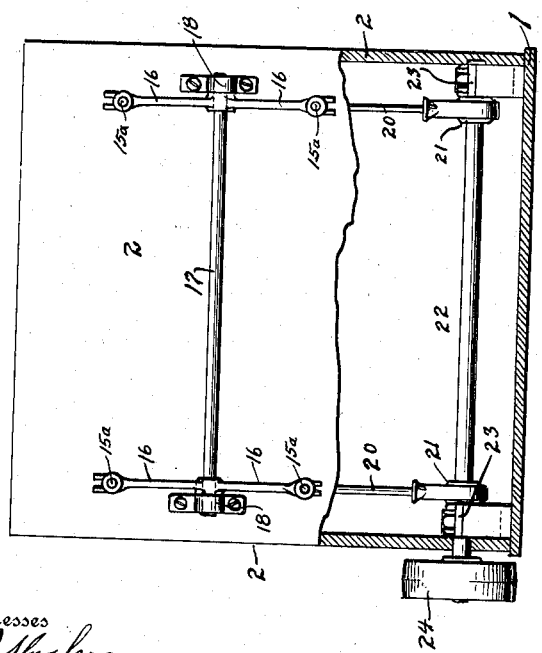
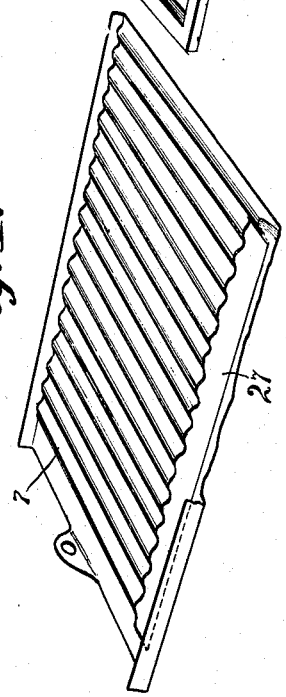
Witnesses  
Jos. J. Hosler.  
Minnie F. Anthony
Inventors  
William P. Clifford  
William W. Rankin  
By Obed C. Billman their Attorney

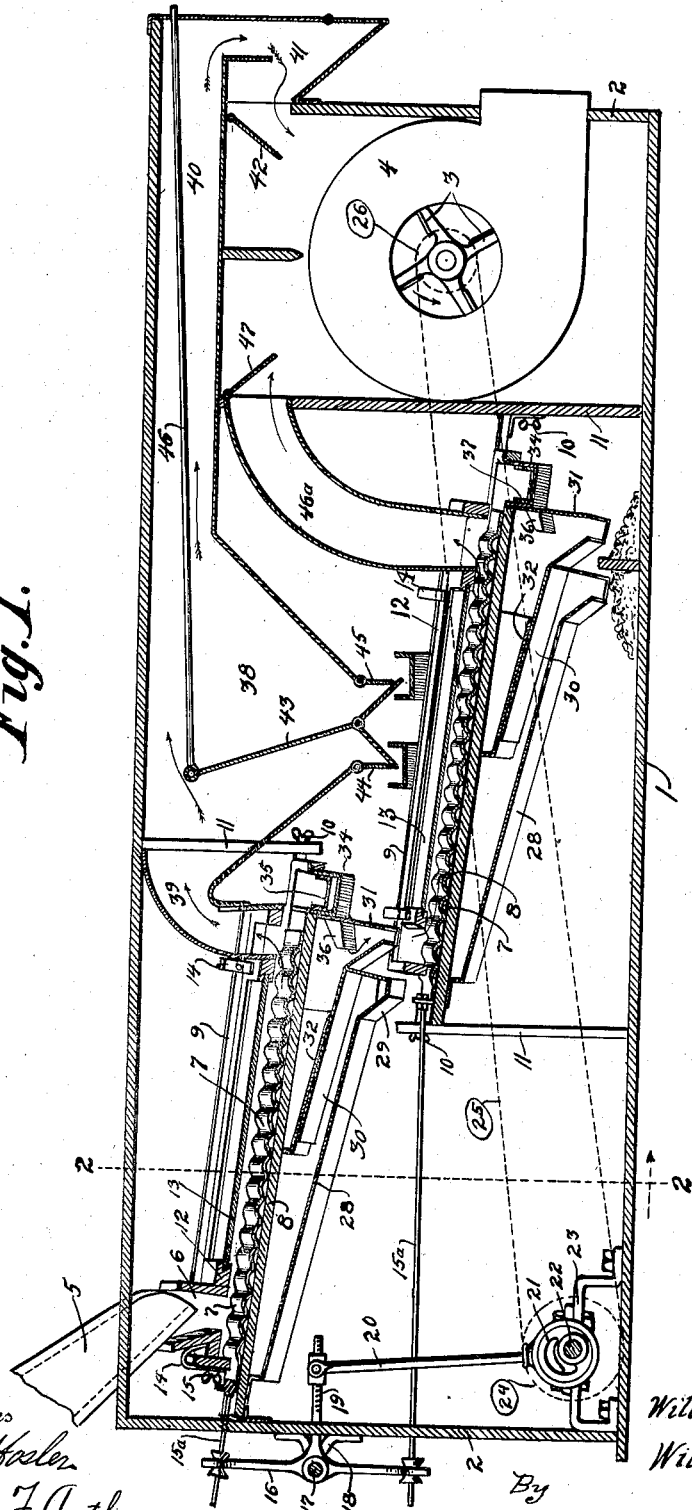

UNITED STATES PATENT OFFICE.

WILLIAM P. CLIFFORD, OF ICONIUM, AND WILLIAM W. RANKIN, OF OTTUMWA, IOWA.

ORE SEPARATING AND CONCENTRATING MACHINE.

No. 853,917.     Specification of Letters Patent.     Patented May 14, 1907.

Application filed March 2, 1906. Serial No. 303,750.

*To all whom it may concern:*

Be it known that we, WILLIAM P. CLIFFORD and WILLIAM W. RANKIN, citizens of the United States, residing at Iconium, in the county of Appanoose and State of Iowa, and at Ottumwa, Wapello county, Iowa, respectively, have invented new and useful Improvements in Ore Separating and Concentrating Machines, of which the following is a specification.

The invention relates to improvements in ore separating and concentrating machines; and the invention belongs to that type or class of machines in which the valuable particles of the crushed or reduced ore are concentrated into as small a bulk as is economically advantageous by the fall of the particles in air currents. This concentration of particles is generally brought about by the fall of the particles in water; but, as is well known, by this process the concentration depends upon the difference in specific gravity of the valuable ore and the waste vein stone or rock.

The smaller particles of ore are separated by a variety of machines. The action of many of them is based upon the behavior of particles carried down an inclined plane by a thin stream of water. If the gradient of the plane and the strength of the thin current are properly arranged, the denser particles will be deposited and the specifically lighter ones washed away, although they may be equal-falling if allowed to settle in deep water.

The paramount object of this invention is to overcome many of the difficulties experienced in concentrating in water, and to produce a generally improved ore separating and concentrating machine, which will be simple in construction, cheap of manufacture, and efficient in use.

Another object of the invention is to produce an improved ore separating and concentrating machine for the treatment of very fine ores and practically saving all fine ores and mineral dust heretofore wasted away in treating by the water process, or by improper air blasts, or air currents, improperly applied in machines of this class.

With these ends in view, the invention consists in the novel construction, arrangement and combination of parts hereinafter described, illustrated in the accompanying drawings, and particularly pointed out in the appended claims.

Referring to the accompanying drawings, forming a part of this specification, Figure 1 is a horizontal sectional view of the improved ore separating and concentrating machine with a portion of its side wall, adjacent to the fan, left intact in order that the construction may be more readily understood. Fig. 2, a transverse sectional view taken through line 2—2 of Fig. 1. Fig. 3, a view, partly in section, of the front end of the machine. Fig. 4, a perspective view of the corrugated shaker-plate. Fig. 5, a detailed perspective view of the base plate upon which the corrugated shaker-plate is slidably mounted.

Similar numerals and letters of reference designate like parts throughout all the figures of the drawings.

Referring now to the drawings, the frame of the machine consists of suitable base beams and uprights 1, to which are secured the side and end walls 2, of the machine.

The machine is known as a "dry worker," in which the various particles of ore are concentrated by means of air blasts and currents produced through the medium of a suction-fan 3, suitably mounted in a casing 4, located at the rear or fan end of the machine. The ore enters the machine from the crusher through a chute 5, located at the front or receiving portion of the machine, where it falls into a hopper 6.

The ores are concentrated and separated and carried through the machine through the medium of air currents, and, in the present instance, a pair of inclined corrugated shaker-plates 7, slidably mounted upon a pair of supporting-boards or plates 8, provided with side walls or boards 9, and said supporting boards or plates are adjustably mounted and secured within the frame of the machine by means of adjusting bolts and thumb nuts 10, secured to standards 11, of the machine. The supporting-boards or plates 8, are inclined laterally, as well as longitudinally, and these inclinations may be changed as desired to provide for various ores and the desired concentrations thereof by means of the said adjusting bolts and nuts 10. A frame 12, carrying a glass plate 13, is adjustably secured above the corrugated shaker-plates 7, by means of curved supporting-straps 14, taking over the side walls or boards 9, and are secured thereto by means of thumb-nuts 15. The glass plates 13, are adapted to afford an air passage intermediate the same and said shaker-plates 7, and by means of the adjusting means referred to the same may be raised or lowered to increase or decrease the air passages, thus increasing or decreasing the force of the air currents as may be desired.
The glass plates 13, also enable the operator to observe the behavior of the ores upon the shaker-plate 7.

The shaker-plates 7, are slidably mounted on the supporting boards or plates 8, and are moved to and fro thereon by means of a pair of connecting-rods 15$^a$, secured at their rear ends in any suitable and convenient manner, and said connecting-rods 15$^a$, are secured to the upper and lower ends of a pair of vertically-arranged operating-bars 16, mounted on a rock-shaft 17, secured in suitable bearings 18, secured to the front end of the machine. The rock-shaft 17, with the vertically-arranged operating-bars 16, carried thereby, are operated by means of a pair of crankarms 19, adapted to be oscillated by means of a pair of eccentric rods or bars 20, operated by a pair of eccentric blocks 21, mounted on the revoluble shaft 22. The shaft 22, is mounted in suitable bearings 23, of the machine, and is provided at its end with a pulley 24, operated by means of a belting 25, passing over the same and over a pulley 26, secured to the end of the shaft of the suction fan 3, at the rear or fan end of the machine.

The supporting-boards or plates 8, and the corrugated-shaker-plates 7, slidably mounted above, being inclined laterally to the right, as well as inclined longitudinally toward the fan end of the machine, as the material enters at the upper left hand corners or portions of the shaker-plates 7, it will be drawn across and over the shaker-plates 7, by the force of the air currents, gravity, and the inclination and vibration of the shaker-plates, whereby the pure ore will be drawn forwardly and laterally along the shaker-plates, a portion of the pure ore falling through an opening or slot 27, (see Figs. 2 and 5), in one side of the shaker-plates 7, and supporting-boards or plates 8, and below upon a chute 28 inclined longitudinally, and laterally to the left, and the finished ore carried thereby is conveyed and deposited by means of the trough portion 29, formed with said chute 28, and deposited as finished ore. A second chute 30, is mounted beneath the opening or slot 27, and is adapted to receive the less finished ore from the sides of the shaker-plates above, and to convey the material thus received through the medium of a trough 31, formed integral therewith, to the upper left hand corner of the succeeding shaker-plate, for further treatment, or should this chute be beneath the last shaker-plate of a series, then to a convenient place of deposit where it may be taken up and again treated, if desired. A dividing valve 32, is slidably mounted in the chute 30, beneath the opening or slot 27, and is adapted to be moved longitudinally to meet the requirements of various ores and the desired concentrations thereof.

A transverse opening or slot 33, is formed at one end of the supporting-board or plate 8, and is provided with the transverse chute 34, having its receiving end adapted to receive the finished tailings from the lower right hand corner of the shaker-plates and convey the same to some suitable place of deposit. A second chute 35, is arranged above the chute 34, and is adapted to receive the less finished ores from the end of the shaker-plate, and is provided at its lower end with a trough 36, emptying into the trough 31, of the chute 32, whence it is conveyed through the trough 31, to the upper left hand corner of the succeeding shaker-plate for further treatment, or should it be the last in the series, then to some suitable place of deposit, where it may be again taken up and retreated, if found necessary or desirable. A sliding valve 37, is slidably mounted in the chute 34, and is adapted to be moved along the opening 33, to provide for the various ores and for varying the concentrations thereof. It will be understood that any number of shaker-plates with the necessary connections may be arranged in a series in one machine, if found necessary or desirable.

A trunk 38, is mounted, in the present instance, in front of the first shaker-plate and its necessary connections and communicates with the air passage above the shaker-plate by means of the air passage 39, at the rear of the trunk 38, and said trunk communicates with the suction-fan through the medium of the air passage 40, trunk 41, and valve 42. A dividing board or partition 43, is mounted transversely in the trunk 38, and pivotally attached at its lower end, intermediate valves 44, and 45, formed at the lower end of said trunk 38. The dividing-board or partitions 43, is operated, in the present instance, by means of an operating-rod 46, secured to the free end thereof and extending to the rear end of the machine. The tailings deposited through the valve 44, may be returned for further treatment, if desired, while the valve 45, is adapted to deposit finished tailings. An air passage 46$^a$, provided with the valve 47, communicates with the suction-fan and with the air passage above the second or succeeding shaker-plate, as the parts are arranged in the machine, herein shown and described.

When the machine is in operation, it will be observed that the finer and less valuable particles of ore will be drawn by the force of the air blasts or currents through the air pas- 1 0 sages described, and as it moves along through the various parts, it will be deposited, as hereinbefore specified, and the trunk 41, is adapted to catch and receive many mineral dusts heretofore wasted by the water process, such as zinc, yellow and red ocher, etc.

As the air currents are drawn along and across the corrugated shaker-plates, and are vibrated, the lighter particles of ore are agitated and worked to the top and are drawn by the air currents over and across the corrugations, while the heavier particles of ore are gradually worked down into the lowest portions of the channels or corrugations and down toward the lower or discharge ends of the same. The corrugated shaker-plates are slightly inclined toward the corner diagonally opposite the corner where the material enters.

The purer and finer grades of ore will therefore be found near the lower ends of the first corrugations, and the material with little or no ore in it will be found at the upper ends of the last corrugations. The material or ore from these points tends to grow less pure in the one instance, and richer and more pure in ore in the other instance, as it moves toward the corner diagonally opposite the corner of intake, and hence by the use of the sliding valves 32 and 37, we may provide for the various ores and the desired concentrations thereof.

Having thus described the various parts of our invention, its operation and advantages will be readily understood by those skilled in the art to which it appertains.

Without having attempted to set forth all the forms in which it may be made or all the modes of its use, we declare that what we claim as our invention, and desire to secure by Letters Patent, is—

1. An ore separating machine, consisting of a suitable frame provided with side and end walls, a laterally and longitudinally inclined supporting-board or plate adjustably mounted therein, a slidably mounted shaker-plate mounted on said supporting-board or plate, an adjustably mounted plate secured above said shaker-plate and affording an air-passage, said supporting-board or plate being provided with an opening or passage at its side and end, inclined chutes mounted beneath said openings or slots, and means for operating said shaker-plate.

2. In an ore separating and concentrating machine, the combination with a longitudinally and laterally inclined supporting-plate, and a suitably mounted shaker-plate supported above said supporting-plate and provided with a slot at its side; of a chute mounted beneath said slot and provided with a sliding-valve.

3. In an ore separating and concentrating machine, the combination with a longitudinally and laterally inclined supporting-plate provided with suitable openings or slots at the side and end, and a corrugated shaker-plate slidably mounted above said supporting-plate; of a chute mounted beneath said openings or slots of said supporting-plate.

4. In an ore separating and concentrating machine, the combination with an adjustably mounted longitudinally and laterally-inclined supporting-plate and a shaker-plate slidably mounted immediately above the same; of reverse laterally-inclined chutes adapted to receive the material from the sides and ends of said supporting and shaker-plates.

5. An ore separating and concentrating machine, consisting of a pair of laterally and longitudinally inclined supporting-boards or plates adjustably mounted therein, a shaker-plate slidably mounted on said supporting-boards or plates, adjustably mounted plates secured above said shaker-plates and affording an air passage, said supporting-boards or plates being provided with an opening or slot formed at the sides and ends thereof, inclined chutes mounted beneath said openings or slots, a trunk suitably mounted and provided with an air passage communicating with the air passage above the shaker-plate, a suction fan suitably mounted in a casing and provided with an air passage leading to said trunk, an air passage communicating with a suction fan and the air passage above the second or succeeding shaker-plate, and means for operating said shaker-plates.

6. In an ore separating and concentrating machine, the combination with a pair of laterally and longitudinally inclined supporting-boards or plates, and a pair of shaker-plates slidably mounted thereon; of supporting-boards or plates provided with an opening or slot formed at the sides and ends thereof, a pair of longitudinally and laterally inclined chutes mounted beneath said opening or slot formed at the sides of said supporting-boards or plates, and a pair of laterally inclined chutes mounted beneath said openings or slots formed at the ends of said supporting-boards or plates.

7. In an ore separating machine, the combination with an inclined supporting-board and slidably mounted shaker-plate each provided with a longitudinally-extending slot; of an inclined chute mounted beneath said slot, and a dividing valve mounted in said inclined chute.

8. In an ore separating machine, the combination with a laterally and longitudinally-inclined supporting-board provided with longitudinally and transversely-extending slots and a shaker-plate; of chutes mounted beneath said slots, and dividing valves mounted in said chutes and adapted to be moved along said slots.

9. In an ore concentrating machine, the combination with an inclined supporting-board, and a similarly inclined shaker-plate slidably mounted thereon and provided with a longitudinally-extending slot; of a longitudinally and laterally inclined chute mounted beneath said slot and provided with a dividing valve.

10. In an ore concentrating machine, the combination with a longitudinally and laterally inclined supporting-plate, a corrugated shaker-plate slidably mounted thereon, and provided with a transverse opening or slot formed at one end thereof; of a transverse chute mounted beneath said opening or slot, and a sliding valve mounted in said transverse chute.

11. In an ore concentrating machine, the combination with a laterally inclined supporting-plate, a shaker-plate slidably mounted thereon, and provided with a slot formed at the side thereof; of a reverse laterally inclined chute mounted beneath said supporting-plate and provided with a dividing valve beneath said slot.

12. In an ore concentrating machine, the combination with a laterally inclined supporting-plate provided with side and end slots, and a laterally-corrugated shaker-plate slidably mounted above said supporting-plate; of an oppositely inclined chute mounted beneath said end slot and provided with a sliding dividing valve.

13. In an ore concentrating machine, the combination with a longitudinally and laterally inclined supporting-plate, a shaker plate mounted thereon, a laterally and longitudinally oppositely inclined chute mounted beneath said supporting-plate, and a supporting-plate provided with longitudinal and lateral slots; of a chute mounted beneath said lateral slot, and a second chute mounted therein and provided with a trough leading to said chute mounted beneath said supporting-plate.

14. In an ore concentrating machine, the combination with a laterally and longitudinally inclined supporting-plate, and a shaker-plate slidably mounted thereon; of a supporting-plate provided with laterally and longitudinally-extending slots, inclined chutes mounted beneath said slots, and sliding dividing valves mounted in said chutes.

15. In an ore concentrating machine, the combination with a longitudinally and laterally inclined supporting-plate, a corrugated shaker-plate slidably mounted above the same, and chutes adapted to receive material from the sides and ends of said supporting and shaker-plates; of a plate secured above said shaker-plate and affording an air passage, a trunk suitably mounted and provided with an air passage communicating with said air passage above said shaker-plate, and a suction fan mounted in a casing and provided with an air passage leading to said trunk.

In testimony whereof we have affixed our signatures, in presence of two subscribing witnesses.

WILLIAM P. CLIFFORD.
WILLIAM W. RANKIN.

Witnesses:
A. F. RANKIN,
A. B. CLINTON.